United States Patent [19]

Hashimoto et al.

[11] 4,449,232
[45] May 15, 1984

[54] AUDIBLY ANNOUNCING APPARATUS

[75] Inventors: Shintaro Hashimoto, Ikoma; Sigeaki Masuzawa, Nara; Hiroshi Tsuda, Uji; Shinya Sibata; Masahiro Nakano, both of Yamatokoriyama, all of Japan

[73] Assignee: Sharp Kabushiki Kaisha, Osaka, Japan

[21] Appl. No.: 401,556

[22] Filed: Jul. 26, 1982

Related U.S. Application Data

[63] Continuation of Ser. No. 132,181, Mar. 20, 1982.

[30] Foreign Application Priority Data

Mar. 22, 1979 [JP] Japan .................................. 54-33906

[51] Int. Cl.³ .............................................. G10L 1/00
[52] U.S. Cl. ....................................... 381/51; 368/63; 340/384 E

[58] Field of Search .............. 179/1 SM, 2 TC, 6 TA; 340/147 LF, 148, 181, 517, 521, 309.1; 368/384 E, 63, 251, 261; 381/51

[56] References Cited

U.S. PATENT DOCUMENTS

| | | | |
|---|---|---|---|
| 3,641,496 | 2/1972 | Slavin ............................... | 179/1 SM |
| 4,028,663 | 6/1977 | Royer et al. ...................... | 364/900 |
| 4,073,133 | 2/1978 | Earls et al. ....................... | 368/273 |
| 4,144,582 | 3/1979 | Hyatt ................................. | 364/900 |
| 4,158,285 | 6/1979 | Heinsen et al. .................... | 368/251 |
| 4,244,041 | 1/1981 | Vermot .............................. | 368/251 |

Primary Examiner—E. S. Matt Kemeny
Attorney, Agent, or Firm—Birch, Stewart, Kolasch & Birch

[57] ABSTRACT

A timer-announcer system stores instructions for generating various types of time information, e.g., sharp time (announced at a pre-set time); and updated real time (announcing the present time upon demand by a key actuation). The sounds may be simultaneously required, in which case logic circuits assign relative priorities for delivery of the instructions to the sound synthesizer.

10 Claims, 14 Drawing Figures

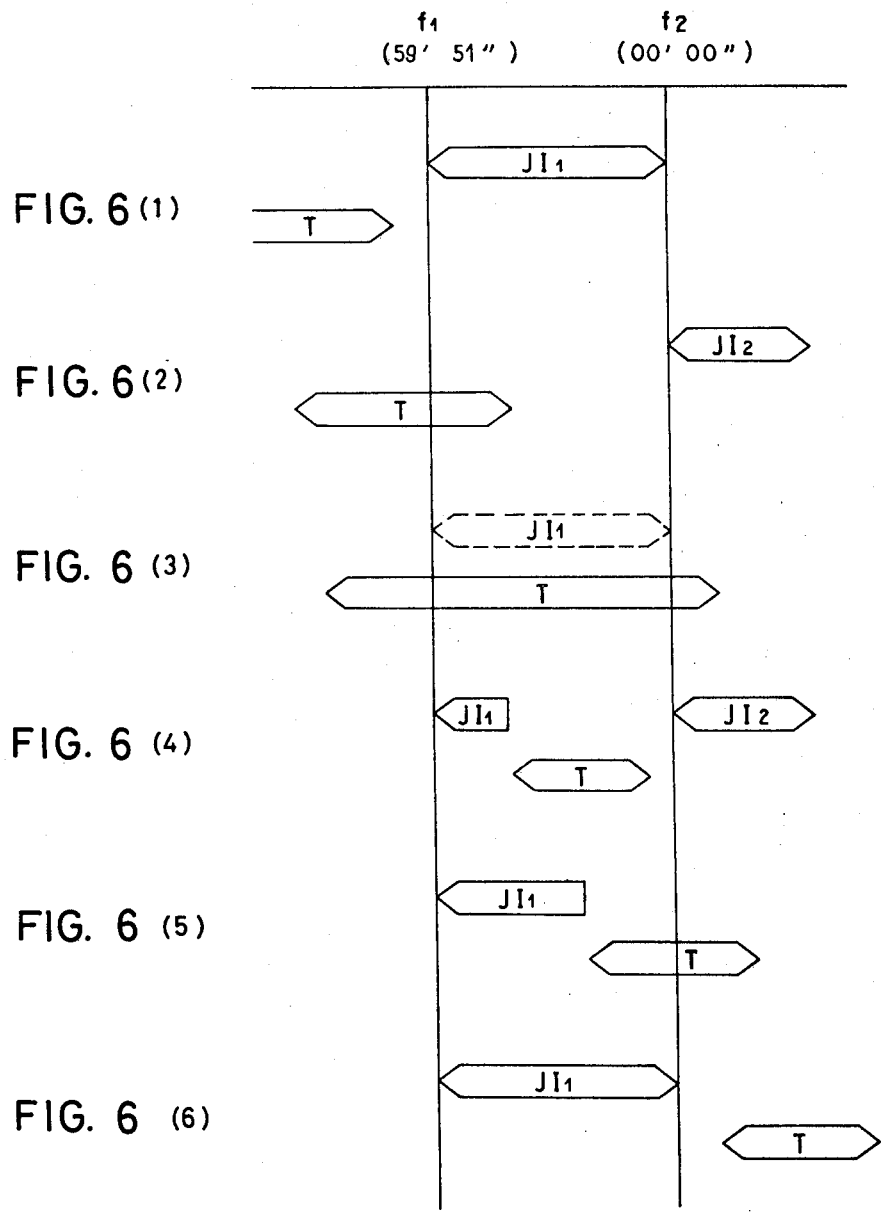

AUDIBLY ANNOUNCING APPARATUS

This application is a continuation of copending application Ser. No. 132,181, filed on Mar. 20, 1982.

BACKGROUND OF THE INVENTION

This invention relates to a method of preventing overlap delivery of a plurality of audible indications of information in an audible announcing output apparatus.

In the case of visual indications of information, it need not take a great deal of time to complete the visual delivery of information. Nevertheless, audible indications of information require necessarily a substantial amount of time as compared with the visual indications. Accordingly, when different kinds of information are to be indicated at a time, many problems will occur mainly with audible indications. If different kinds of information, like news and weather forecasts, are audibly announced at the same time, one would not be able to hear both of those announcements. For instance, if only first information is allowed to be announced, then it is impossible for the operator to know information other than the first information.

These problems are most severe with talking clocks and the like which deal with time information. There are great possibilities that a certain kind of information may overlap with another kind of information, when considering (1) announcement of updated or real time, (2) announcement of alarm information, and (3) announcement of each sharp time, that is, time information which is audibly recited each specific time period within the hour, for example, each 59 minutes, 48 second time period.

Overlap occurs between (1) and (2); alarm time is reached in the middle of announcement of real time or real time is recalled in the middle of announcement of alarm information.

Overlap occurs between (2) and (3): the clock shows sharp time to be audibly announced during the course of announcement of alarm information. Instead, alarm time is reached during announcement of sharp time.

And overlap occurs between (1) and (3): sharp time arrives during the course of announcement of updated or real time and the operator recalls updated or real time during the course of announcement of sharp time.

The same is true of the relationship among (1), (2) and (3).

OBJECTS AND SUMMARY OF THE INVENTION

Accordingly, it is a general object of the present invention to provide an audibly announcing apparatus which overcomes the above discussed problems and thus avoids overlap and simultaneous delivery of audible indications of information by allowing information with the first priority to be delivered when two or more items of information are to be delivered.

Briefly, according to the present invention an audibly announcing apparatus providing audible indications of a plurality of items of information under control of instructions including means for determining whether said instructions are overlapped with each other and means for determining the order of priority of said instructions.

BRIEF DESCRIPTION OF THE DRAWINGS

The foregoing as well as other objects, features and advantages of the present invention will become more readily appreciated upon the consideration of the following detailed description of the illustrated embodiments, together with the accompanying drawings, wherein:

FIG. 6 is a time chart showing the announcing state in another preferred form of the present invention.

DETAILED DESCRIPTION OF THE ILLUSTRATED EMBODIMENT

Figure 1:
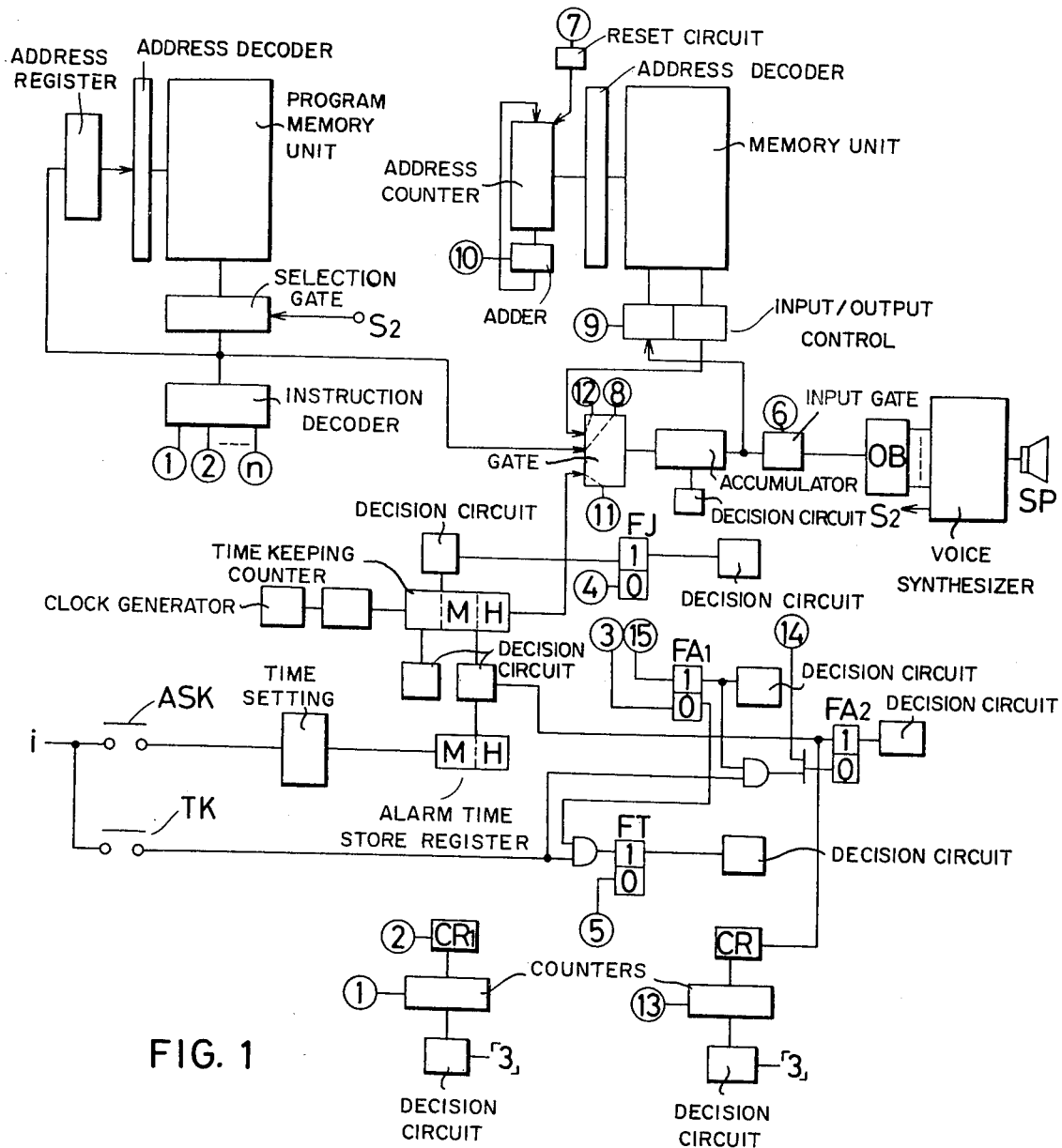
FIG. 1 is a schematic block diagram of one preferred embodiment of the present invention.

Specific embodiments of the present invention will now be discussed in detail in terms of a talking timepiece. The following summarizes the concept of the present invention when applied to a talking timepiece.

In order to prevent overlap between (1) announcement of updated or real time and (2) announcement of alarm information, there is provided a switch means for instructing the timepiece to announce updated time in the form of an audible sound or voice but serving as a halt switch for discontinuing announcement alarm information during the course of sharp time. Also when alarm time is reached during the course of real time announcement, announcement of real time comes to a halt and the alarm information is given priority as the most significant information upon actuation of the switch means.

With respect to overlap between (2) announcement of alarm information and (3) information of each sharp time, it should be understood that each sharp time is announced between 59 min 48 sec and 00 min 0.3 sec and alarm information can be preset in units up to minutes. Announcement of the alarm information starts at each 00 seconds and continues within a limited length of time (say, 48 seconds). Therefore, overlap extends between only 0.3 seconds and the present invention avoids such overlap by delaying 0.3 seconds the time when alarm information is announced. The fact that alarmed time is delayed from its accurate one by 0.3 seconds is no significant importance for practical use and sharp time is very accurately announced without any delay or error.

Overlap between (1) announcement of real time and (3) that of each sharp time is overcome in the manner by which announcement of real time is interrupted and announcement of each sharp time is allowed, when each sharp time is reached in the middle of announcement of real time, and announcement of real or updated time is inhibited with that of each sharp time having priority, when in the middle of announcement of each sharp time.

It is also evident from the foregoing that any overlap is offset among (1) announcement of current time, (2) announcement of alarm time and (3) announcement of each sharp time.

Current or updated time of day is announced in the form of an audible message "it is ___ hours ___ minutes.". Alarm time is announced in the form of "peep peep peep peep peep it is now ___ hours ___ minutes" three times and at each 00 seconds with an appropriate interval of time. Each sharp time is audibly indicated in the form of "peep peep it is ___ o'clock, peep peep peep."

Referring now to FIG. 1, there is illustrated a talking timepiece constructed in accordance with one preferred form of the present invention, which includes an instruction memory (program memory) set up with a conventional read only memory, an address register RAR, an address decoder RDC, an instruction selection gate circuit RUG, and an instruction decoder IM which develops a string of micro instructions ①-(n) in response to the contents fetched from the program memory RU via the selection gate circuit RUG. A memory unit RM of a random access memory temporarily stores respective data to be audibly announced and has as its peripheral circuit elements an address counter AC, an address decoder AD, an input output control circuit MS, an adder FA which increments the address counter AC, and a reset circuit ACR which places the counter AC into the reset state. An accumulator ACC has its accessories an input gate GA, an output buffer OB with its input gate GO, and a decision circuit JRE which decides whether the data transferred into the accumulator ACC are a transfer end code EC described later.

A clock generator CG is coupled to a divider DV which in turn generates standard signals for timekeeping purposes. A timekeeping counter CO includes a seconds section S, a minutes section M and a hours section H. A register AR stores alarm time which can be preset upon actuation of an alarm time set key ASK via a time setting circuit AS.

A decision circuit JS decides if the contents of the seconds section S are zero and another decision circuit JA decides if the contents of the timekeeping counter CO are in agreement with the respective minutes and hours sections M and H of the alarm time register AR. A decision circuit JJ, on the other hand, decides if the time comes when announcement of each sharp time is due to start (59 minutes 48 seconds) while monitoring the counts of the seconds and minutes sections S and M. A time recall key TK serves as a halt key for discontinuing announcement of alarm time in the middle of the announcement of alarm time as set forth previously.

Counters $C_1$ and $C_2$ count the time of announcement of alarm information (the former counts the time of continued announcements and the latter counts the time of intermittent or spaced announcements). The both have their circuits $CR_1$ and $CR_2$ and decision circuits $JC_1$ and $JC_2$ as to whether the time exceeds three.

FJ, $FA_1$, $FA_2$ and FT are conditional flip flops which provide various controls. Decision circuits $JF_1$, $JF_2$, $JF_3$ and $JF_4$ sense those flip flops in the set state.

Figure 2:
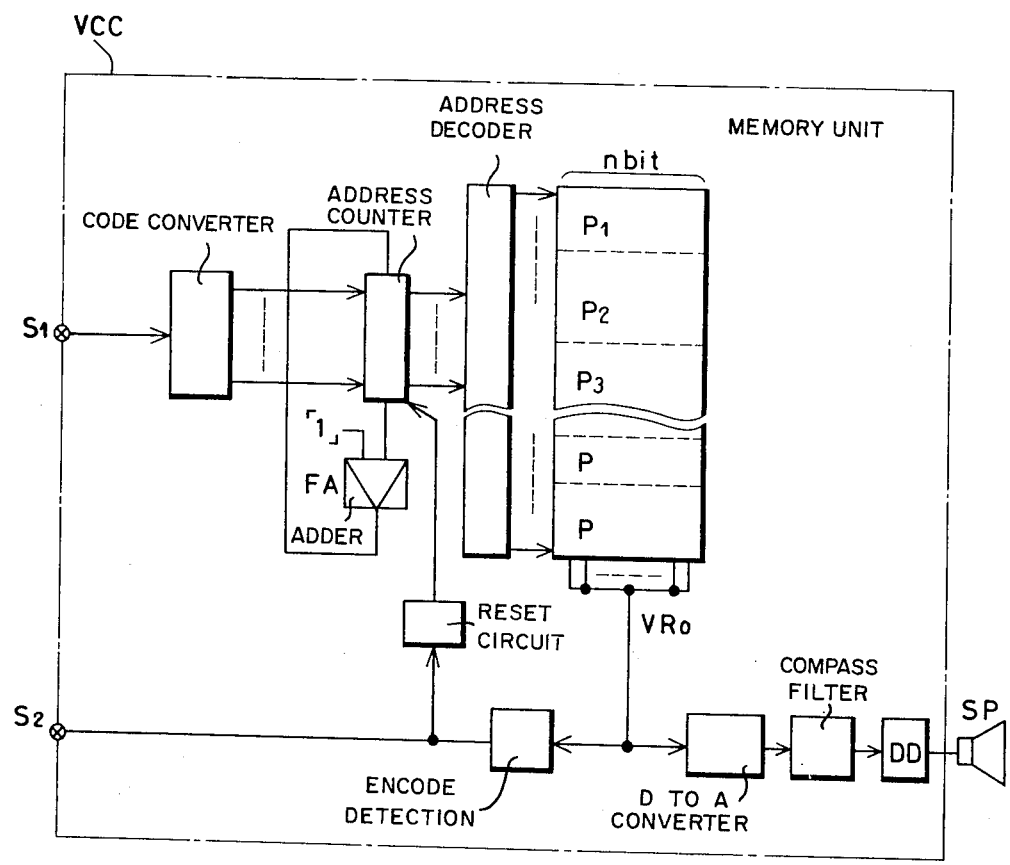
FIG. 2 is a block diagram showing details of a principal part of the embodiment of FIG. 1.

The illustrated timepiece further includes a sound output control circuit or a voice synthesizer VCC which can be realized by use of large scale integrated circuit technology, a loud speaker SP and an output buffer OB through which outputs are supplied to the loud speaker for the delivery of audible indications of a variety of time information. Details of the voice synthesizer VCC are depicted in a block diagram of FIG. 2.

A memory unit VR of a well known read only memory is adapted to store sound quantizing data and has an address counter VAC and an address decoder VAD. When no sound is required to announce, a reset circuit CLA clears the address counter VAC not to specify any address of the memory unit VR. An adder FA increments the address specified by the address counter VAC by one and executes operation of VAC+1-→VAC automatically at a given sampling frequency once an initial address for any specific sound region P has been set up for the delivery of sounds or audible messages. This leads to sequential readout of the quantizing date from that region.

A code converter CC receives sound region specifying signals $S_1$ from the output buffer OB and converts them into codes suitable for loading the initial address for the specific sound region P into the address counter VAC. An END code detector JE senses an END code inserted at the final step of the respective regions P and renders the reset circuit CLA operative to reset the address counter VAC. This output of the detector is applied as a signal $S_2$ to the instruction selection gate RUG for establishment of the next initial address.

As is well known in the art, the voice synthesizer VCC also comprises a digital to analog converter DAC, a low pass filter LPF, a speaker driver DD and the above mentioned loud speaker SP.

Figure 3:
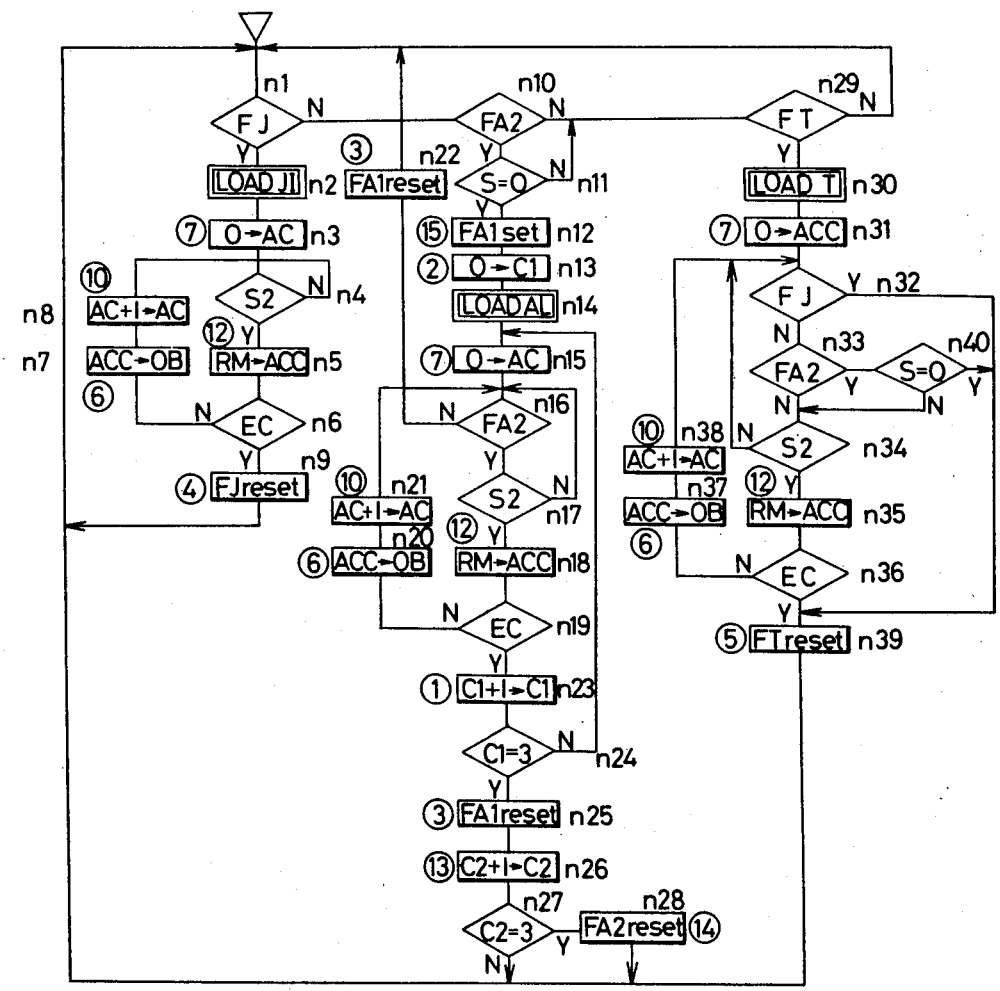
FIG. 3 is a flow chart for explanation of operation of the embodiment of FIG. 1.

Operation of the above described arrangement will be more clearly understood by reference to a flow chart of FIG. 3.

The step $n_1$ senses the flip flop FJ in the set state using the decision circuit $JF_1$, the step $n_{10}$ senses the flip flop $FA_2$ in the set state through the decision circuit $JF_3$ and the step $n_{29}$ senses the flip flop FT in the set state through the decision circuit $JF_4$. The flip flop FJ is set when the seconds and minutes sections S and M of the timekeeping counter CO show 59 minutes and 48 seconds as viewed by the decision circuit JJ, thus initiating announcement of each sharp time.

The flip flop $FA_2$ is set when the contents of the timekeeping counter CO agree with the contents of the hours and minutes sections H and M of the alarm time register AR as sensed by the decision circuit JA. In other words, with the flip flop $FA_2$ in the set state, announcement of alarm time starts. When the flip flop $FA_1$ is in the reset state as discussed hereinbelow and the time recall key TK is actuated, the flip flop FT triggers announcement of real or updated time. By a sequence of the steps $n_1 \rightarrow n_{10} \rightarrow n_{29}$, priority is determined in the order of announcement of sharp time, announcement of alarm time and announcement of updated time.

ANNOUNCEMENT OF SHARP TIME

If the step $n_1$ detects the flip flop FJ in the set state, then the step $n_2$ becomes operative to transfer a string JI of word data into the memory unit RM. The transferring of the word data JI is viewed in FIG. 4(a) wherein the respective word data are sent sequentially into the memory unit RM in order to deliver the above mentioned message "peep peep, it is ___ o'clock, peep peep peep peep." This mode of operation will now be discussed in further detail.

Figures 4A, 4B, 4C, 5A, 5B:
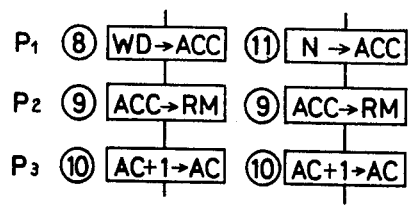
FIGS. 4(a) through 4(c) detail part of the flow chart of FIG. 3.
FIGS. 5(a) and 5(b) are flow charts showing further details of part of FIGS. 4(a) through 4(c)

During the first step $m_0$ the micro instruction ⑦ is developed to reset the address counter AC with the help of the reset circuit ACR. This specifies the initial address of the word data to be loaded into the memory unit RM. The respective data words WD such as "peep", etc. are transferred as depicted in a flow chart of FIG. 5(a) and the numerical data N in the hours section H as in FIG. 5(b). For the linguistic data WD, the micro instruction ⑧ is developed at the step $P_1$ to unload the linguistic data WD from the program memory RU into the accumulator ACC via the input gate GA. The step $P_2$ follows wherein the micro instruction ⑨ is developed to transfer them into the memory unit RM via the input output control circuit MS. The micro instruction ⑩ developed during the step $P_3$ operates the adder FA to increment the address counter AC by one for next succeeding transmission of data. With respect to the numerical data N, the micro instruction ⑪ during the step $P_1$ sends the contents of the hours section H (plus one through an appropriate circuit although not shown, in the case of announcement of sharp time) to the accumulator ACC. Through the steps $P_2$ and $P_3$ as discussed previously the numerical data N are loaded into the memory unit RM and the address counter AC is incremented by one. After those linguistic data WD and numerical data N have been sequentially transferred into the memory unit RM, the transmission end code EC goes to the memory unit RM during the step $m_{10}$ as depicted in FIG. 5(a).

Upon the completion of transmission of the word data string JI, the micro instruction ⑦ is developed during the step $n_3$ to reset again the address counter AC which is now ready for next readout operation. The step $n_4$ decides if the signal $S_2$ is derived from the voice synthesizer VCC and in other words whether the decision circuit JE senses the END code from the respective sound regions P within the voice synthesizer VCC. In the presence of the signal $S_2$ (indicative of the sensed end code) the step $n_5$ becomes operable to develop the micro instruction ⑫ and fetch the word data from the memory unit RM into the accumulator ACC. The step $n_6$ decides if the word data transferred into the accumulator ACC are indicative of the end code EC. If not, the step $n_7$ is executed to develop the micro instruction ⑥ and supply the word data to the output buffer OB via the input gate GO.

Within the voice synthesizer VCC (see FIG. 2), a specific sound region P is designated in response to the transferred word data, the region storing its corresponding quantizing data which in turn are sequentially fetched for the delivery of an audible message. The step $n_3$ is to specify the next readout address of the memory unit RM generating the micro instruction ⑩ and incrementing the address counter AC by one, followed by the step $n_4$ which is set aside until the data relating one word are actually announced in the form of a synthesized voice. The step $n_5$ is reached once the one word-related data have completely been announced. Those steps $n_4$ through $n_8$ are repeated until the transmission end code EC appears during the step $n_6$. The step $n_9$ follows wherein the micro instruction ④ is useful in resetting the flip flop FJ and recovering the step $n_1$, after the transmission end code EC is sensed.

ANNOUNCEMENT OF ALARM INFORMATION

Alarm information is announced if the flip flop $FA_2$ in the set state is sensed by the step $n_{10}$. However, in the case where both alarm time and sharp time are to be announced at the same time, the step $n_{10}$ is not reached until sharp time has been completely announced with the flip flop FJ in the set state. As previously set forth, the step $n_{10}$ is executed with a time lag of 0.3 seconds which is negligible from a practical point of view. On the other hand, with no overlap between alarm time and sharp time, the step $n_{10}$ is executed at once after the set state of the flip flop $FA_2$ has been detected.

The step $n_{11}$ makes the decision circuit JJ operative to decide if the count of the seconds section S of the timekeeping counter CO shows zero. Immediately after equality between alarm time and sharp time is detected, it shows zero and makes the step $n_{12}$ operative to develop the micro instruction ⑮ and set the flip flop $FA_1$. As is clear from FIG. 1, the setting of the flip flop $FA_1$ makes it possible to reset the flip flop $FA_2$ upon actuation of the time recall key TK and thus interrupt announcement of alarm information in progress.

The step $n_{14}$ transfers the word data string AL into the memory unit RM as viewed from FIG. 4(b). In order to deliver the message "peep peep peep peep, it is now ___ hours ___ minutes", the associated word data are fetched in sequence from the memory unit RM. The same procedure described above with respect to announcement of sharp time is applicable to this situation. The steps $n_{15}$ through $n_{21}$ are carried out in a similar manner so that the respective word data are sequentially supplied to the voice synthesizer VCC. The step $n_{17}$ which makes decision as to the signal $S_2$ is preceded by the step $n_{16}$ which senses the flip flop $FA_2$ in the set state while the signal $S_2$ appears through repetition of the steps $n_{16}$–$n_{21}$. Accordingly, if the time recall key TK is actuated in the middle of announcement, then the flip flop $FA_2$ is reset to return the step $n_1$ and halt announcement of alarm time. The step $n_{22}$ is interposed between the steps $n_{16}$ and $n_1$, which develops the micro instruction 3 and resets the flip flop $FA_1$.

After the step $n_{19}$ senses the development of the transmission end code EC, the step $n_{23}$ is carried out to develop the micro instruction ① and increment the counter $C_1$. By the action of the decision circuit $JC_1$, the step $n_{24}$ decides if the count of the counter $C_1$ is three. If not, the step $n_{16}$ is returned to repeat the delivery of sounds. It goes without saying that the step $n_{16}$ senses the flip flop $FA_2$ in the set state during the delivery of audible sounds. If continued announcement of the same message are delivered three times without halt, then the procedure advances from $n_{24}$ toward $n_{25}$, developing the micro instruction ③ and placing the flip flop $FA_1$ into the reset state. The three continued announcements extend within 48 seconds.

With the flip flop $FA_1$ in the reset state, the step $n_{26}$ becomes effective to develop the micro instruction ⑬ and increment the counter $C_2$. The step $n_{27}$ monitors the contents of the counter $C_2$ using the decision circuit $JC_2$, followed by the step $n_1$ when they are not three. Since the flip flop FJ is normally in the reset state, the procedure proceeds with the step $n_{10}$ which decides if the second section S assumes zero. If not, the steps $n_1 \rightarrow n_{10} \rightarrow n_{11} \rightarrow n_{29} \rightarrow n_1$ are repeated until the seconds section S assumes zero. If the seconds section S shows zero, then the step $n_{12}$ is effected for transmission and readout of the word data string AL. It is appreciated that the contents of the minutes section M in the word data string AL are one more than the previous one upon the passage of time.

If sharp time is reached until the seconds section S assumes zero, then the step $n_1$ senses the flip flop FT in the set state. Thereafter, the steps $n_2$ and so forth are effected for announcement of sharp time. During the progress of announcement of sharp time a sequence of the steps $n_1 \rightarrow n_{10} \rightarrow n_{11}$ are not carried out so that announcement of alarm time begins with a time delay of 0.3 seconds from each 00 seconds. Even if the time recall key TK is actuated during announcement of alarm time, the flip flop $FA_2$ is not reset because the flip flop $FA_1$ has already been reset during the step $n_{24}$. But upon actuation of the key TK the flip flop FT is placed into the set state which is confirmed by the step $n_{29}$ relying upon the decision circuit $JF_4$. This decision initiates announcement of real or updated time as will be discussed in detail below.

After the message is repeated three times at an appropriate interval without actuation of the key TK, the step $n_{27}$ decides that the contents of the counter $C_2$ are three and renders the step $n_{28}$ operative to develop the micro instruction 14 and reset the flip flop $FA_2$. The step $n_1$ is returned, thus completing normal announcement of alarm information.

ANNOUNCEMENT OF UPDATED TIME

Upon actuation of the time recall key TK the flip flop FT is set and confirmed by the step $n_{29}$ which in turn operates the step $n_{30}$ for loading the word data string T into the memory unit RM. The string T is transferred as shown in FIG. 4(c) to announce updated time in the form of a message "it is ___ o'clock." Details of such transmission are substantially similar to that for other types of time information as discussed in greater detail. The step $n_{31}$ is executed to develop ⑦ and zero the address counter AC for the next succeeding readout operation. The step $n_{34}$ is preceded by the step $n_{32}$ which senses the flip flop in the set state and the step $n_{33}$ which senses the flip flop $FA_2$ in the set state. These two steps are repeated until the development of the signal $S_2$. Repeated execution of the steps $n_{32}$–$n_{38}$ fetches sequentially to respective ones of the word data string T and supplies them to the voice synthesizer VCC as set forth above.

If sharp time comes during the course of announcement, the flip flop FJ is set and confirmed by the step $n_{32}$. The result is that the step $n_1$ is returned via the step $n_{39}$ to initiate announcement of sharp time through execution of the steps $n_2$ and so forth. When alarm time is reached, the step $n_{33}$ senses the flip flop $FA_2$ in the set state and the step $n_{40}$ decides if the contents of the seconds section S assume zero. The procedure advances in the order of $n_{39}$, $n_1$ and $n_{10}$. Announcement of alarm time begins by the step $n_{11}$ and following steps. The step $n_{39}$ develops the micro instruction 5 and resets the flip flop FT, while the step $n_{36}$ terminates announcement of updated time inclusive under the situation where the transmission end code EC is sensed by the step $n_{36}$.

It is noted earlier that the flip flop FT may be set upon actuation of the time recall key TK during the course of announcement of alarm time. In this case the step $n_{29}$ senses the flip flop FT in the set state, making the step $n_{30}$ and following steps operative. The step $n_{33}$ senses the flip flop $FA_2$ in the reset state during the progress of announcement of alarm time. Since the contents of the seconds section S are not zero under the circumstance, the step $n_{40}$ renders the step $n_{34}$ operative. This enables updated time to be read out during the course of announcement of alarm time. Provided that the seconds section S assumes zero during announcement of updated time, the step $n_{39}$ is executed to interrupt announcement of updated time to re-start announcement of alarm information.

FIG. 6 shows another preferred form of the present invention, wherein T indicates announcement of any desired time such as announcement of current time and $JI_1$ and $JI_2$ indicate announcement of each sharp time. In other words, there are two different kinds of announcement of sharp time and for example $JI_1$ takes the form of "please attention, it is now ___ o'clock, peep peep peep" and the latter in the form of "it is ___ hours ___ minutes."

Announcement of each sharp time $JI_1$ normally begins with each 59 minutes 51 seconds $t_1$ and ends with 00 seconds $t_2$. In the case where announcement T of any specific time ends before 59 minutes 51 seconds $t_1$ as depicted in FIG. 6(1) or announcement T starts after 00 minutes 00 seconds $t_2$ as depicted in FIG. 6(6), there is no problem with overlapping announcements. However, in the case where announcement T of any specific time extends between 59 minutes 51 seconds $t_1$ and 00 minutes 00 seconds, $t_2$ as depicted in FIG. 6(2), announcement T continues without executing announcement $JI_1$ and instead the different type of announcement $JI_2$ starts at 00 minutes 00 seconds $t_2$. When announcement T of any specific time continues between 59 minutes 51 seconds $t_1$ and 00 minutes 00 seconds $t_2$, as shown in FIG. 6(3), neither $JI_1$ nor $JI_2$ does commence. In addition, when an instruction is given for announcement of any specific time on the way of announcement of sharp time $JI_1$, announcement of sharp time $JI_1$ is interrupted and new announcement T is allowed to start. Under the condition of FIG. 6(4) where announcement T ends before 00 minutes 00 seconds $t_2$, the different type of sharp time $JI_2$ is allowed to continue. Announcement T continues after passing 00 minutes 00 seconds as depicted in FIG. 6(5) without releasing the different type of announcement $JI_2$.

In this manner, announcement T of any specific time is given priority and either of the different announcements $JI_1$ and $JI_2$ is selected according to the time when priority information is announced.

The specific examples as herein shown and described are for illustrative purposes. Various changes will no doubt occur to those skilled in the art and will be understood as forming a part of the present invention insofar as they fall within the spirit and scope of the appended claims.

We claim:

1. An apparatus capable of generating a plurality of audible sounds indicative, respectively, of a plurality of types of time information, said apparatus comprising:
    means for developing a first instruction indicative of a first of said types of time information, the first type of time information being sharp time, said sharp time representing time information which is announced at a certain specific period of time for each hour;
    means for developing a second instruction indicative of a second of said types of time information, the second type of time information being alarm time, said alarm time representing time information which is preset into said apparatus and is announced when an actual time equals the preset alarm time;
    means for developing a third instruction indicative of a third type of time information, the third type of time information being updated real time information which is announced when a key on said apparatus is actuated, the development of the third instruction signal representing the need to develop an audible sound indicative of the updated real time;
    logic means for determining whether the first, second and third instructions are being concurrently developed, said logic means further assigning relative priorities to the third, second and third instructions if the first, second and third instructions are concurrently developed; and audible sound developing means sequentially generating audible sounds, indicative of the respective types of time information, in a descending order of priority from the highest to the lowest.

2. An apparatus in accordance with claim 1, wherein the audible sound developing means generates the audible sound indicative of said sharp time and inhibits the future development of the audible sound indicative of said updated real time in response to the relative priorities assigned by the logic means to the first instruction and to the third instruction, respectively, when the first and third instructions are concurrently developed.

3. An apparatus in accordance with claim 1, wherein the audible sound developing means generates the audible sound indicative of said sharp time and interrupts the current development of the audible sound indicative of said updated real time in response to the relative priorities assigned by the logic means to the first instruction and to the third instruction, respectively, when the first and third instructions are developed concurrently.

4. An apparatus in accordance with claim 1, wherein the audible sound developing means generates the audible sound indicative of said alarm time and interrupts the current development of the audible sound indicative of said updated real time in response to the relative priorities assigned by the logic means to the second instruction and the third instruction, respectively, when the second and third instructions are developed concurrently.

5. An apparatus capable of generating a plurality of audible sounds indicative of a respective plurality of items of information, said apparatus comprising:
means for developing a first instruction indicative of a first item of information;
means for developing a second instruction indicative of a second item of information;
means for developing a third instruction, subsequent in time to the development of the second instruction indicative of a third item of information;
logic means connected to the means for developing for determining if the first, second, and third instructions are developed concurrently,
said logic means assigning a higher priority to the first instruction over the second instruction if only the first and the second instruction are developed concurrently,
said logic means assigning a higher priority to the first instruction over the third instruction if only the first and the third instructions are developed concurrently,
said logic means assigning a higher priority to the first instruction over the second and the third instructions if the first instruction is under development when the second and the third instructions are developed; and
audible sound developing means connected to the logic means for generating a first audible sound respresenting the first instruction and a second audible sound, subsequent to the first audible sound, representing the third instruction when the first and the second instructions are concurrently developed,
said audible sound developing means generating a first audible sound representing the second instruction and a second audible sound, subsequent to the first audible sound, representing the first instruction when the first and the third instructions are concurrently developed,
said audible sound developing means generating a single audible sound representing the first instruction when the first instruction is under development concurrently with the development of the second and third instructions.

6. An apparatus capable of generating a plurality of audible sounds indicative of a respective plurality of items of information, said apparatus comprising:
means for developing a first instruction indicative of a first item of information;
means for developing a second instruction indicative of a second item of information;
means for developing a third instruction indicative of a third item of instruction,
logic means connected to the means for developing for determining if the first, second, and third instructions are developed concurrently,
said logic means assigning a highest priority to the first instruction and a second highest priority to the second and third instructions if the first instruction is developed concurrently with either or both of the second and third instructions; and
audible sound developing means connected to the logic means for generating a first audible sound representing the first instructions and selectively generating a second audible sound representing either the second or the third instructions depending upon whether the first instruction is developed concurrently with either the third instruction or the second instruction, respectively,
said audible sound developing means failing to generate said second audible sound when the first instruction is developed concurrently with both the second and the third instructions.

7. An apparatus in accordance with claim 6, wherein the period of time announcement of the second audible sound representative of the second instructions is longer than the period of time of announcement of the second audible sound representative of the third instruction.

8. An apparatus capable of generating a plurality of audible sounds indicative, respectively, of a plurality of types of time information, said apparatus comprising:
means for developing a first instruction indicative of a first of said types of time information;
means for developing a second instruction indicative of a second of said types of time information;
means for developing a third instruction indicative of a third of said types of sound information;
logic means for determining whether the first, second and third instructions are being concurrently developed, said logic means further assigning relative priorities to the first, second and third instructions if the first and the second instructions are concurrently developed; and
audible sound developing means sequentially generating audible sounds, indicative of the respective types of time information, in a descending order of priority from the highest to the lowest.

9. The apparatus in accordance with claim 8, further including means for interrupting an audible sound being generated and substituting an audible sound of higher priority in response to said determination of concurrent development by said logic means.

10. An apparatus capable of generating a plurality of audible sounds indicative, respectively of a plurality of types of time information, said apparatus comprising:

means for developing al first instruction indicative of a first of said types of time information;

means for developing a second instruction indicative of a second of said types of time information;

logic means for determining whether the first instruction and the second instruction are being concurrently developed, said logic means further assigning relative priorities to the first and second instructions if the first and the second instructions are concurrently developed;

audible sound developing means connected to the logic means and responsive to the first and second instructions for generating a first audible sound indicative of the type of time information associated with the higher priority instruction and for generating a second audible sound, subsequent in time to the generation of the first audible sound, indicative of the type of time information associated with the lower priority instruction; and means for interrupting an audible sound being generated and substituting an audible sound of higher priority in response to said determination of concurrent development by said logic means.

* * * * *